(12) United States Patent
Huber

(10) Patent No.: US 11,999,234 B2
(45) Date of Patent: Jun. 4, 2024

(54) METHOD FOR OPERATING A FIELD-OF-VISION DISPLAY DEVICE FOR A MOTOR VEHICLE

(71) Applicant: Bayerische Motoren Werke Aktiengesellschaft, Munich (DE)

(72) Inventor: Wolfgang-Andreas Huber, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 667 days.

(21) Appl. No.: 17/269,898

(22) PCT Filed: Sep. 4, 2019

(86) PCT No.: PCT/EP2019/073522
§ 371 (c)(1),
(2) Date: Feb. 19, 2021

(87) PCT Pub. No.: WO2020/049018
PCT Pub. Date: Mar. 12, 2020

(65) Prior Publication Data
US 2021/0323410 A1 Oct. 21, 2021

(30) Foreign Application Priority Data
Sep. 7, 2018 (DE) ...................... 10 2018 215 272.1

(51) Int. Cl.
*B60K 35/60* (2024.01)
*B60K 35/10* (2024.01)
(Continued)

(52) U.S. Cl.
CPC .............. *B60K 35/60* (2024.01); *B60K 35/10* (2024.01); *B60K 35/211* (2024.01); *B60K 35/23* (2024.01);
(Continued)

(58) Field of Classification Search
CPC ............ B60K 2370/1529; B60K 37/02; B60K 2370/149; B60K 2370/1531;
(Continued)

(56) References Cited

U.S. PATENT DOCUMENTS 10,310,257 B2 * 6/2019 Hirata ...................... G09G 3/14
11,175,500 B2 * 11/2021 Harada ................ H04N 9/3108
(Continued)

FOREIGN PATENT DOCUMENTS

DE     29 48 721 A1    6/1981
DE    101 31 720 A1    1/2003
(Continued)

OTHER PUBLICATIONS

International Search Report (PCT/ISA/210) issued in PCT Application No. PCT/EP2019/073522 dated Dec. 3, 2019 with English translation (five (5) pages).
(Continued)

*Primary Examiner* — Boubacar Abdou Tchoussou
(74) *Attorney, Agent, or Firm* — Crowell & Moring LLP

(57) ABSTRACT

A method for operating a field-of-vision display device for a motor vehicle, including an electrically controllable planar pixel assembly for generating a projection light beam having a display content and a reflection-suppressing deflection assembly, which is arranged on the planar pixel assembly and includes one or more flat reflection surfaces, extending along the planar pixel assembly at a predefined acute angle thereto and parallel to one another, for projecting the generated projection light beam onto a partially transparent, reflective projection pane, including a windshield of the motor vehicle, as a result of which a virtual display image shown in a field of vision of a user is generated behind the projection pane, wherein: the one or more reflection surfaces are each light-absorbing on the rear side thereof in order to
(Continued)

suppress interfering reflection; at least one driving situation parameter is provided, in dependence on which different area segments of the planar pixel assembly are used to generate a desired display content.

10 Claims, 10 Drawing Sheets

(51) Int. Cl.
  *B60K 35/21* (2024.01)
  *B60K 35/23* (2024.01)
  *B60K 35/28* (2024.01)
  *B60K 35/29* (2024.01)

(52) U.S. Cl.
  CPC .............. *B60K 35/28* (2024.01); *B60K 35/29* (2024.01); *B60K 2360/149* (2024.01); *B60K 2360/177* (2024.01); *B60K 2360/186* (2024.01); *B60K 2360/191* (2024.01); *B60K 2360/349* (2024.01)

(58) Field of Classification Search
  CPC ........ B60K 2370/177; B60K 2370/186; B60K 2370/191; B60K 2370/349; B60K 2370/23; B60K 2370/334; B60K 35/00; G02B 2027/0118; G02B 2027/014; G02B 2027/0141; G02B 5/045; G02B 5/30; G02B 2027/0129; G02B 2027/0187; G02B 5/003; G02B 2027/012; G02B 27/0093; G02B 27/0101
  See application file for complete search history.

(56) References Cited

U.S. PATENT DOCUMENTS

| 2004/0178894 | A1 | 9/2004 | Janssen |
| 2016/0004076 | A1* | 1/2016 | Matsubara ............ G06T 19/006 345/7 |
| 2016/0368417 | A1 | 12/2016 | Bassi et al. |
| 2017/0045740 | A1* | 2/2017 | Hirata .................. H04N 9/3164 |
| 2020/0073120 | A1 | 3/2020 | von Spiegel et al. |

FOREIGN PATENT DOCUMENTS

| DE | 10 2009 045 169 A1 | 3/2011 |
| DE | 10 2009 054 232 A1 | 5/2011 |
| DE | 10 2015 222 842 A1 | 5/2017 |
| DE | 10 2016 224 162 A1 | 6/2018 |
| JP | 2000-289488 A | 10/2000 |
| WO | WO 2014/162182 A1 | 10/2014 |
| WO | WO 2018/095935 A1 | 5/2018 |

OTHER PUBLICATIONS

German-language Written Opinion (PCT/ISA/237) issued in PCT Application No. PCT/EP2019/073522 dated Dec. 3, 2019 (six (6) pages).

German-language Search Report issued in German Application No. 10 2018 215 272.1 dated Apr. 15, 2019 with partial English translation (19 pages).

* cited by examiner

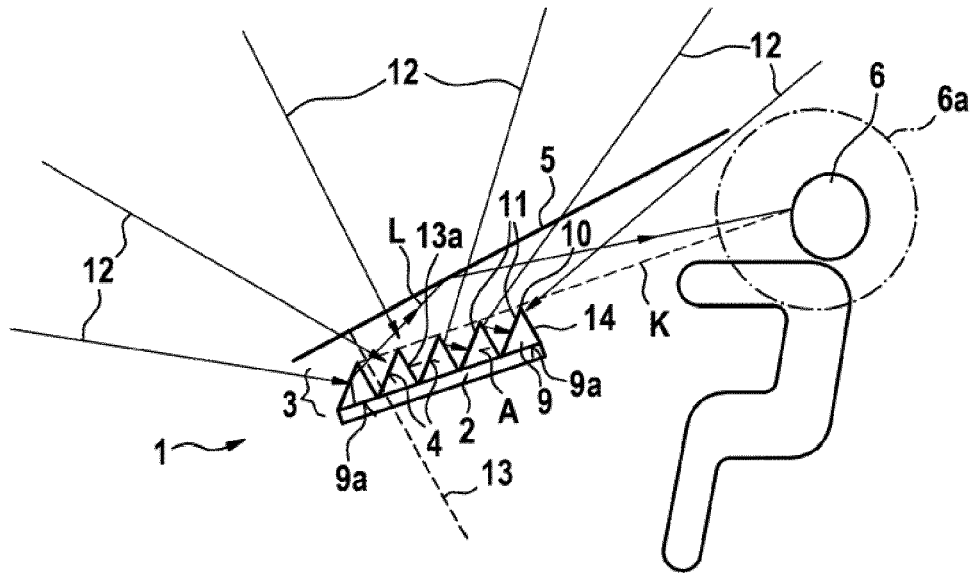
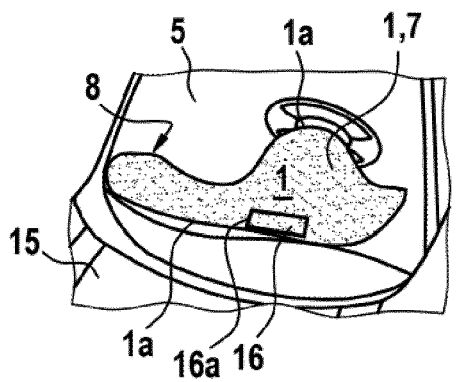
Fig. 2a
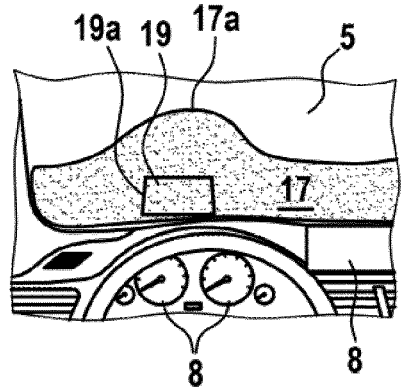
Fig. 2b
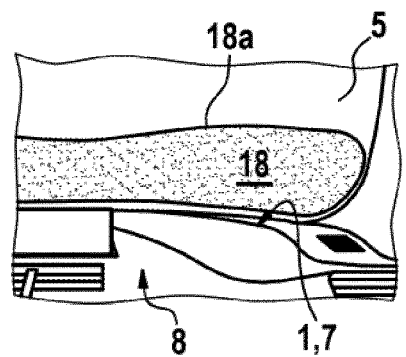
Fig. 2c

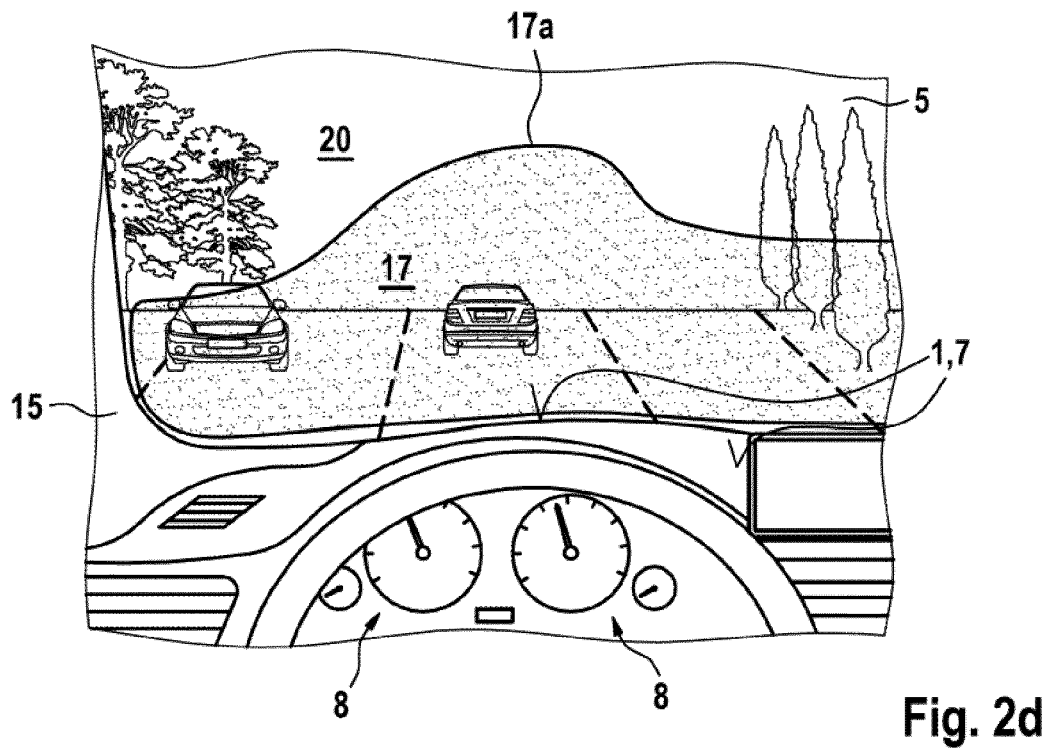
Fig. 2d
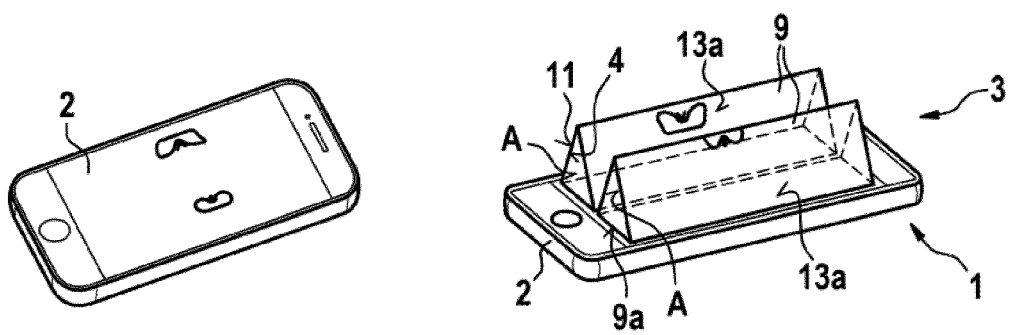
Fig. 3a
Fig. 3b

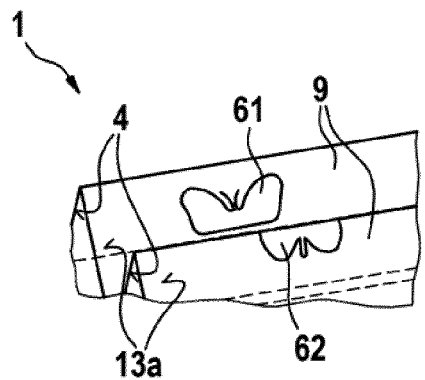
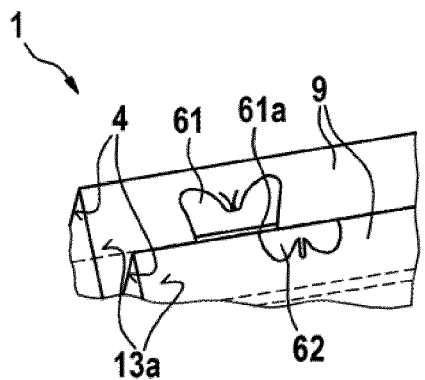
Fig. 10a     Fig. 10b
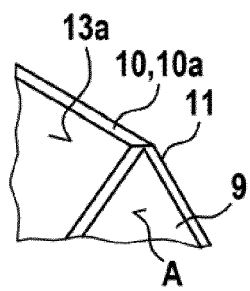
Fig. 11a
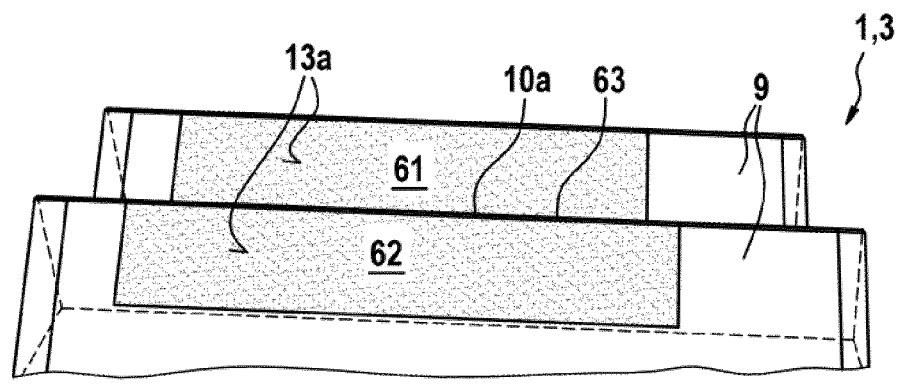
Fig. 11b

METHOD FOR OPERATING A FIELD-OF-VISION DISPLAY DEVICE FOR A MOTOR VEHICLE

BACKGROUND AND SUMMARY OF THE INVENTION

The invention relates to a method for operating a field-of-vision display device, in particular a head-up display, for a motor vehicle, and also a corresponding control unit and a motor vehicle equipped therewith.

Field-of-vision display devices in a motor vehicle are known in particular under the name head-up display (HUD). A display content, such as a specification of a speed limit, is thus overlaid as a virtual display image in the field of vision of the driver in front of the motor vehicle, so that he does not have to look away from the road. For this purpose, a field-of-vision display device typically comprises a projection unit, which, by way of a display screen housed below a dashboard upper side having a suitable projection optical unit, generates a projection light beam having desired display content and projects it on a partially transparent projection pane, for example, the windshield of the motor vehicle, from which it is reflected toward the driver.

In this conventional design, the HUD has a relatively small field of vision, which generally only extends just up to the horizon, and the distance of the virtual display image is defined by the optical structure of the projection unit. An enlargement of the field of vision is opposed by the limited installation space within the dashboard. In particular, the known projection optical unit occupies a large amount of space in the vertical direction. The driver more or less looks into a telescope in this case, so that a display image which is close to him and is generated on the display in the HUD interior appears at a distance in front of the motor vehicle. Therefore, only limited spatial angles are displayable in accordance with an "opening of the telescope," in which the HUD display image can be overlaid on the view through the windshield. Contact-analog overlays, as are known from augmented reality, for example, are not possible outside this limited spatial angle.

On the other hand, from DE 10 2009 054 232 A1, for example, a head-up display for stereoscopic information display in a motor vehicle is known, which has image generating means for generating two different individual images intended for the two eyes of an occupant and a display unit, on which light spots can be generated, the light beams of which are visible to the occupant by reflection on the windshield of the motor vehicle. Furthermore, deflection means, for example, a matrix-like arrangement of small lenses, are provided in the beam path between the display unit and the windshield, which deflect light beams of different light spots in different emission directions. Moreover, pixel association means ensure an association of pixels of the individual images with light spots of the display unit in such a way that for the left eye of the occupant, the individual image intended for it is visible and for the right eye of the occupant, the individual image intended for it is visible. An autostereoscopic display screen display of this type can be particularly favorable for a contact-analog display of the contents.

In field-of-vision display devices, additional measures are generally provided which suppress interfering reflections of ambient light on the components thereof, which could result in dazzling of the user. For this purpose, in a conventional HUD, for example, a cover plate, which terminates the projection unit to the outside, is geometrically made antireflective (so-called glare trap). Antireflective technologies known from this are not suitable, however, for a display screen arranged directly opposite to the windshield.

It is the object of the present invention to provide an operating method for a field-of-vision display device, in particular for a motor vehicle, which is improved especially with regard to the safety and/or the comfort of one or more users in respective different (travel) situations.

SUMMARY OF THE INVENTION

This object is achieved by a method for operating a field-of-vision display device, a corresponding control unit, a non-transitory computer-readable medium, and a motor vehicle according to the independent claims. Further embodiments are specified in the dependent claims. All refining features and effects mentioned in the claims and the description for the method also apply with respect to the field-of-vision display device itself, the control unit, the non-transitory computer-readable medium, or the motor vehicle, and also vice versa.

According to a first aspect, a method is provided for operating a field-of-vision display device, in particular for a motor vehicle. The field-of-vision display device comprises an electrically actuatable planar pixel arrangement, in particular at least one flat display screen or a different two-dimensional pixel matrix, for generating a projection light beam having a desired display content. Furthermore, the field-of-vision display device comprises a reflection-suppressing deflection arrangement arranged on the planar pixel arrangement, which comprises one or more flat reflection surface(s) extending along the planar pixel arrangement at a predetermined acute angle in relation thereto and in parallel to one another for projecting the generated projection light beam on a partially transparent reflective projection pane, in particular a windshield of the motor vehicle, whereby a virtual display image overlaid in a field of vision of a user (for example of the driver or another occupant of the motor vehicle) is generated behind it. The rear side(s) of the reflection surface(s) is/are made light-absorbing for interfering reflection suppression.

The method comprises the following steps:
providing at least one (travel) situation parameter and
using different surface segments in each case of the (large) area pixel arrangement for generating a desired display content depending on the provided (travel) situation parameter(s). By way of such a flexible, (travel) situation-dependent adapted selection of suitable surface segments for an otherwise predetermined display content, for example, the safety and/or the comfort of one or more users of the field-of-vision display device can be significantly increased.

The term "planar" means very generally here that the pixel arrangement extends in the form of a two-dimensional pixel matrix over a surface which can be at least regionally flat or also curved or bulging. In particular, the planar pixel arrangement can be adapted if needed to a bulge of the upper side of the dashboard of a motor vehicle, for example in that it is constructed stepped or interleaved from multiple smaller partial surfaces, for example flat display screens.

The multiple reflection surfaces parallel to one another of the reflection-suppressing deflection arrangement can be formed identically to one another or can differ from one another in their shape or size. Depending on their shape or size, their distance from one another in a direction perpendicular to their extension direction can be selected in such a way that a nearly complete interfering reflection suppression and an essentially loss-free and shape-maintaining deflection of the projection light beam are ensured. Some examples of this are specified below. In principle, any sunlight-absorbing coating known per se is suitable for the rear sides of the reflection surfaces, for example, a matte black layer. The term "essentially" can mean in particular herein a production-related or design-related possible deviation in the context of the described functional principle, which can make up, for example not more than approximately 10% of relevant suitable measured variables.

In contrast to the conventional HUD design mentioned at the outset having a projection optical unit housed in the interior of the dashboard of a motor vehicle, a field-of-vision display device of the type described herein has a significantly flatter structure and can be installed, for example, with only a few centimeters installation depth in an upper side of the dashboard or installed thereon later. This makes possible a significant expansion of the field of vision of the field-of-vision display device, for example also vertically significantly beyond the horizon, which is suitable in particular for contact-analog displays for the driver and other occupants to assist the navigation or in autonomous driving and/or for multiuser operation having multiple users simultaneously (cf. FIGS. 2a-2d and 14). A real contact-analog 3D effect (stereo-augmented reality) is thus possible in particular, wherein the contact-analog display can be both binocular and also monocular.

The planar pixel arrangement can be designed for this purpose in a way known per se, for example, according to DE 10 2009 054 232 A1, for autostereoscopic or 3D display. That is to say, such a planar pixel arrangement can be actuated by an image generating unit and/or a control unit in such a way that two different 2D images reach the left and the right eye of the user in order to give a three-dimensional impression of the displayed virtual display image to him, without aids such as 3D spectacles directly in front of his eyes. In this way, for example, displays perceived as three-dimensional by the driver of a motor vehicle can be generated at arbitrary distances between approximately 1 m and up to infinitely far from his eyes. All convergence planes are implementable simultaneously in principle here, which enables immersion in a virtual 3D world. The planar pixel arrangement can also be designed at least in regions for 2D display, i.e., without the impression of depth, however.

The projection pane is arranged in operation of the field-of-vision display device above the reflection-suppressing deflection arrangement in such a way that it reflects the deflected projection light beam to the eyes of the user, whereby a virtual display image results behind the projection pane. In particular, in the case of a windshield of the motor vehicle, and similarly also in all other applications, in the actuation of the planar pixel arrangement, for example, a correction of a possible curvature of the projection pane can be implemented by a suitable correction algorithm in the scope of the image generating. In particular, a one-time system calibration for an individual windshield geometry can be implemented for this purpose in the control unit. A basic design is ascertained here on the basis of CAD data provided by the producer for the respective vehicle type. The optical properties of windshields are subject to variation in the production process, which can result in deviations from the CAD data, which can be ascertained by means of an individual system calibration and stored, for example, by a suitable algorithm as a correction function in addition to the warping data of an ideal windshield in the control unit of the field-of-vision display device and used for correction in operation of the HUD. For this purpose, for example, a suitable test image having a calibration pattern (for example checkerboard pattern) can be projected by the HUD via the windshield and the resulting virtual display test image can be analyzed by a system made up of image acquisition and processing unit. By way of such a correction, optical properties can be ensured in operation of the HUD from the viewpoint of the user which correspond to those of an ideal windshield. According to the same principle, production-related individual deviations of other components of the field-of-vision display device, for example the image generating unit, the planar pixel arrangement, and/or the reflection-suppressing deflection arrangement, can also be compensated for.

In particular, the provision of at least one (travel) situation parameter can comprise the acquisition of a current user position, for example an eye position or a viewing direction. This can be implemented, for example by eye tracking or other known means (cf. FIG. 6).

Depending on the provided current user position, if an object to be displayed is allocated onto two or more flat reflection surfaces extending in parallel to one another along the planar pixel arrangement, a lateral offset of object components belonging to adjacent reflection surfaces can be generated within the planar pixel arrangement in such a way that the allocation of corresponding components of the virtual object is still displayed without parallax upon lateral displacements of the head of the user (cf. FIG. 12a).

Alternatively or additionally, an overlap of object components corresponding to adjacent reflection surfaces within the planar pixel arrangement is generated in such a way that the allocation of corresponding components of the virtual object still merges into one another without interruptions even upon rapid vertical displacements of the head of the user (cf. FIG. 10b). Rapid in these terms can be, for example, head movements in the vertical direction which an implemented algorithm (for example in a control unit) for allocating the object to be displayed as a virtual display image onto multiple reflection surfaces cannot follow due to internal latency times, which are used for example for the transmission and processing of an eye tracking signal, so fast that image-free or black strips do not result between the corresponding components of the object overlaid in the field of vision of the user.

Alternatively or additionally, to avoid a visible transition between the allocation of corresponding components of the virtual display image, its smaller objects in the vertical direction (such as small symbols like letters, numbers, etc.) are each generated in a surface segment of the planar pixel arrangement which is associated with a single reflection surface, and/or its larger objects in the vertical direction (e.g., lane markings) are equipped with a concealing texture having horizontal structures, for example, lines (cf. FIG. 12b).

In particular, the provision of at least one (travel) situation parameter can comprise the acquisition of a current environment behind the projection pane, for example an upcoming environment of the motor vehicle, and/or a current user position, for example, an eye position or a viewing direction. Suitable means, for example, optical cameras or radar/lidar systems, for acquiring the environment in these and other method embodiments are known to a person skilled in the art and are often provided in any case onboard the motor vehicle (cf. FIG. 6).

As a function of the acquired current environment and/or the acquired current user position, predetermined display contents to be displayed statically are generated in such a surface segment of the planar pixel arrangement in such a way that a background of the corresponding virtual display image behind the projection pane meets predetermined requirements for the darkness. Thus, for example for display contents which replace an instrument cluster in a motor vehicle, a field of vision (within the windshield) having dark background can be currently selected in each case. Solely by way of example, via evaluation of the eye tracking (in particular a height of the eye position) and the upcoming environment, it can be geometrically ascertained by a suitable algorithm, for example by means of an environmental model (flat road, hilltop, travel through an underpass, etc.) which region in front of the motor vehicle is available as a suitable "dark" background. A corresponding suitable projection region (in particular in its height) in the windshield or the associated surface segment of the planar pixel arrangement can be dynamically ascertained therefrom and used for the display.

Static display contents, i.e., display contents to be displayed in particular independently of real background objects behind the projection pane, can be, for example, safety-relevant specifications in these and other method embodiments, for example in the case of a motor vehicle, such as warning messages in the event of a critical charge level of an energy accumulator or a critical fill level of a fuel tank onboard or an upcoming storm or a display of a currently existing speed limit or exceeding it, etc.

In particular, the provision of at least one (travel) situation parameter can comprise the acquisition of a current background for predetermined virtual objects to be displayed in a contact-analog manner behind the projection pane and/or a current user position, for example an eye position or a viewing direction. Depending on the acquired current background and/or the acquired current user position, in this method embodiment, the predetermined objects to be displayed in a contact-analog manner
- are dynamically tracked by an in particular dynamic adaptation of their position within the planar pixel arrangement of a position of the acquired current background within the projection pane and/or the acquired current user position; and/or
- are adapted to a distance of the acquired current background by an in particular dynamic adaptation of the object dimensions and/or, in the case of a 3D display, the distances of the individual images for the left and right eye within the planar pixel arrangement (cf. FIG. 14);
- wherein in each case in particular a brightness and/or color of these objects can be adapted, in particular dynamically, to a brightness and/or color of the acquired current background, for example a marking arrow can be displayed significantly lighter in front of a light façade or, vice versa, darker than in front of a dark forest, in order to enhance a contrast effect.

For example, motor vehicle and/or user head movements can be dynamically equalized by the mentioned tracking of the position of contact-analog virtual objects. Thus, for example an overlaid virtual turn-off arrow of an approaching junction can be tracked in such a way that it always points precisely into the correct exit.

Due to the adaptation of the object dimensions to the dynamically varying background distance, a virtual 2D or 3D object can always be generated as the same size for the perception of the user: For example, a contact-analog overlaid arrow can always be displayed smaller at a distance and always be displayed larger when up close in such a way that it is always interpreted as the same size by the user, for example 5 m in size.

For the virtual 3D display, it was possible to prove in a test motor vehicle having a field-of-vision display device described herein that a 2D object image overlaid separately over the windshield for each eye of the user is recognized by the brain as a 3D object, superimposed on one another, and thus perceived with a spatial depth which corresponds to the distance of the individual images: Individual images displayed close to one another within the planar pixel arrangement result in a close 3D object, individual images spaced apart somewhat further result in a 3D object located somewhat further away, and long individual image distances result in very remote 3D objects (cf. FIG. 14).

In particular in the cases in which the field-of-vision display device is installed in a motor vehicle, the provided at least one driving situation parameter can comprise a current movement and/or control state of the motor vehicle and/or a current onboard system and/or occupant state, in particular a number and position of the occupants in the motor vehicle, and/or a currently upcoming environment and/or upcoming route data. As a function of this/these provided driving situation parameter(s), in the field of vision of the driver and/or further occupants, via respective suitable surface segments of the planar pixel arrangement,
- contact-analog display contents, in particular virtual object images and/or markings, are overlaid to assist the driver and/or to clarify a driving situation for him and further occupants in the case of assisted or highly automated or fully automated driving (HAD/FAD); and/or
- predetermined static display contents, in particular safety-relevant specifications on the onboard system state and/or on route data, are overlaid for the driver and/or further occupants in the case of assisted or highly automated or fully automated driving; and/or
- entertainment contents are overlaid for one or more occupants, wherein, for example, corresponding surface segments of the windshield are designed to be switchable between transparent and black to create a cinema experience in a way known per se;
- predetermined, for example safety-relevant or legally prescribed specifications (for example with respect to the onboard system state and/or route data) are generated via surface segments of the planar pixel arrangement designed to generate at least partially p-polarized light, wherein corresponding surface segments of the windshield are designed to reflect p-polarized light.

In this case, separate virtual display images, for example, for the driver and the front passenger, can be generated simultaneously in particular via a different surface segment in each case of a large-area pixel arrangement and thus also the windshield. By way of a true contact-analog display, for example, a correct lane or exit can be marked to assist the navigation or, in the case of autonomous driving, to provide trust in the occupants, the view and intention of the motor vehicle can be visualized by object markings. For similar purposes, static display contents mentioned here and above can also be overlaid in 2D or 3D over surface segments of the windshield which are not used for contact-analog displays and/or are particularly suitable for safety reasons.

Alternatively or additionally thereto, entertainment contents, for example, for occupants of a parked motor vehicle or in the case of the HAD/FAD regime in a suitable partial region of the projection surface for the front passenger, can be displayed via a 3D or 2D display screen of the planar pixel arrangement. A field of vision of the present field-of-vision display device which is enlarged in relation to conventional HUDs can be used here for an increased feeling of comfort for the user and expanded usage options, for example for a cinema experience in 2D or 3D for one or more occupants of the motor vehicle. In particular, in this case a 3D distance (so-called convergence distance) can approximately correspond to the distance of the eyes from the planar pixel arrangement (approximately 1.2 m in the case of typical vehicle geometries from the viewpoint of the driver or front passenger), which enables the focusing of the eyes (so-called accommodation distance) directly on the display overlaid in 3D.

In order that predetermined, for example, safety-relevant specifications are visible to the user even with sunglasses perpendicular in relation to the windshield surface, i.e., p-polarizing sunglasses, they can be displayed via at least partially p-polarizing surface segments of the planar pixel arrangement and the windshield. For this purpose, the planar pixel arrangement can be designed at least in a limited surface segment to emit projection light of a mixed p-polarization and s-polarization (with respect to the windshield) and contain a filter which only lets p-polarization pass, and the windshield can include, for example, a layer reflecting p-polarized light in a known way, for example in a strip approximately 20 cm wide above the windshield base. A double image caused by double reflection on two different boundary surfaces of the windshield can thus also be overcome.

In particular, the provision of at least one (driving) situation parameter can comprise the acquisition of a current user position, in particular, an eye position or a viewing direction. Depending on the acquired current user position, upper edges of the multiple reflection surfaces parallel to one another of the reflection-suppressing deflection arrangement are aligned from the viewpoint of the user essentially on a line leading to his eyes, for example, to conceal the reflection surfaces against a direct view of the user thereon (cf. FIGS. 1, 9b, and 13a-b). This can be adjustable in particular by means of a suitable lift/tilt device, in particular a continuously adjustable slide rail, for the reflection-suppressing deflection arrangement or the planar pixel arrangement, manually or at least partially automatically, for example by eye tracking, and/or can also be ensured for a standard user position at the factory. Alternatively or additionally, surface segments of the planar pixel arrangement, the light of which is located outside the acquired current viewing directions or resulting eye boxes of all participating users, are used as a large-area interior illumination source free of interfering reflections.

In particular, at least one of the reflection surfaces of the reflection-suppressing deflection arrangement can be formed by a lateral surface side of a prism arranged on the planar pixel arrangement. (The prism can have, for example, a triangular, quadrilateral, in particular trapezoidal, or pentagonal cross-sectional area). This can in particular provide a high level of mechanical stability to the respective reflection surface. The prism can be manufactured from any material transparent to the projection light used. In this case, the provision of at least one (travel) situation parameter can comprise, for example, the acquisition of a current viewing direction of the user and, depending thereon, a flat chamfer of one or more upper prism edges can be aligned essentially along the acquired viewing direction in consideration of the reflection on the projection pane (cf. FIGS. 11a-12b). In this way, upon the allocation of an object to be displayed onto multiple reflection surfaces, a visible transition between corresponding components of the virtual display image in the vertical direction can be avoided.

In particular, for each two adjacent reflection surfaces of the reflection-suppressing deflection arrangement, a light exit plane, which connects an upper edge of the one reflection surface and the lower edge of the rear side of the next reflection surface, can be aligned essentially perpendicular to the projection pane in operation of the field-of-vision display device (cf. FIG. 1). This can result in particular in complete interfering reflection suppression for ambient light from any directions.

According to a further aspect, a control unit for a field-of-vision display device is provided, wherein the control unit is designed to carry out a method of the type described herein at least partially automatically. According to a further aspect, a computer program is provided, which, when it is executed in a control unit, is designed to execute a method of the type described herein.

According to a further aspect, a motor vehicle is provided, comprising:

an upper side of a dashboard extending between a windshield of the motor vehicle and the dashboard;
a field-of-vision display device, arranged on or in the upper side of the dashboard, of the type described herein for generating a virtual display image overlaid in a field of vision of the driver and/or further occupants; and
a control unit of the type described herein.

In this case, in particular the planar pixel arrangement or the reflection-suppressing deflection arrangement can be arranged essentially flush with the upper side of the dashboard (cf. FIGS. 2a and 14).

The above aspects of the invention and its embodiments and specific designs are explained in greater detail hereinafter on the basis of the examples illustrated in the appended drawings. The drawings are solely schematic, they are in particular not to be read as true to scale. Similar or corresponding elements are provided therein with the same reference signs.

BRIEF DESCRIPTION OF THE DRAWINGS

FIG. 1 shows a schematic lateral cross-sectional view of a field-of-vision display device of the type described herein;

FIG. 2a shows a perspective view of a possible extension of a field-of-vision display device of the type described herein in an upper side of a dashboard of a motor vehicle;

FIGS. 2b and 2d each show a perspective view of a projection region usable with the field-of-vision display device of FIG. 2a in the windshield of the motor vehicle from the driver viewpoint;

FIG. 2c shows a perspective view of a projection region usable with the field-of-vision display device of FIG. 2a in the windshield of the motor vehicle from the front passenger viewpoint;

FIGS. 3a to 3c show perspective views of a model example of a field-of-vision display device of the type described herein to explain the deflection effect of its reflection-suppressing deflection arrangement having multiple prisms;

FIGS. 10a and 10b show perspective views of the model example according to FIGS. 3a-3c to explain a vertical overlap in the case of the allocation of an object to be displayed onto two reflection surfaces;

FIGS. 11a to 11c show perspective views of a further model example of a field-of-vision display device of the type described herein to explain alignment of a flat chamfer of upper prism edges along the viewing direction of the user;

DETAILED DESCRIPTION OF THE DRAWINGS

Figure 3C:
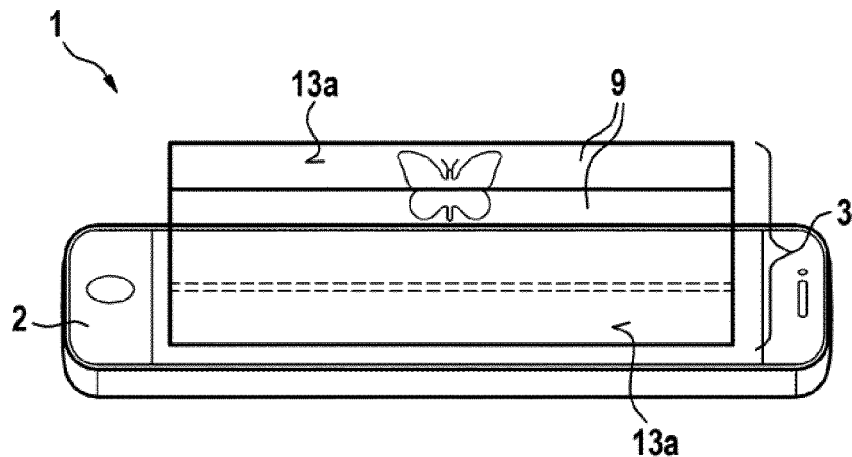

All specific details and variants of the operating method mentioned above and hereinafter in the description and the claims according to the first aspect of the invention, in particular various design features of the relevant field-of-vision display device, can be implemented in the example shown in FIGS. 1 to 14. Vice versa, the specific examples shown in FIGS. 1 to 14 are only to be understood as a simplified, exemplary illustration of the features generally defined in the above description and the claims of the field-of-vision display device and operating method of the type described herein. The definitions thereof specified above are therefore in particular not all repeated again.

FIG. 1 shows a very simplified schematic vertical cross-sectional view of a field-of-vision display device 1 of the type described herein in a motor vehicle (not shown in FIG. 1, cf. FIGS. 2a-2d, 5a-5b, and 14), in particular a head-up display (HUD).

The field-of-vision display device 1 comprises an electrically actuatable planar pixel arrangement 2, which in operation generates a projection light beam L having a desired display content. Furthermore, the field-of-vision display device 1 comprises a reflection-suppressing deflection arrangement 3 arranged on the planar pixel arrangement 2, which in this example comprises multiple (solely by way of example five) flat reflection surfaces 4 extending along the planar pixel arrangement 2 at a predetermined acute angle in relation thereto and in parallel to one another. Due to the deflection of the projection light beam L on the reflection surfaces 4, it is projected on a windshield 5 of the motor vehicle and reflected from this to the eyes of a user 6, in particular of the driver or front passenger (indicated by arrows). A virtual display image (cf. FIGS. 5b, 7, and 8) overlaid in a field of vision of the user 6 thus results behind the windshield 5, which is superimposed for the user 6 with a real environment observed through the windshield 5 in front of the motor vehicle. The predetermined acute angles of attack of the reflection surfaces 4 can be defined for this purpose specifically for the application, for example, from the mutual geometrical arrangement of the planar pixel arrangement 2, the windshield 5, and the user 6. In this case, the reflection surfaces 4 are made light absorbing over the entire surface on the rear sides 11 thereof for interfering reflection suppression.

The field-of-vision display device 1 can be installed, for example, in or on an upper side 7 of a dashboard 8 (not shown in FIG. 1, cf. FIGS. 2a-2d, 5a, and 14) of the motor vehicle between the windshield 5 and the dashboard 8 or a steering wheel. In this case, the planar pixel arrangement 2 or the reflection-suppressing deflection arrangement 3 can be arranged at least in sections, for example essentially flush with the upper side 7 of the dashboard 8, which can be particularly inconspicuous, protective for the optical components or the user 6, and/or space-saving.

In FIG. 1, solely by way of example, all reflection surfaces 4 of the reflection-suppressing deflection arrangement 3 are formed by lateral surface sides of prisms 9 made of glass or plastic resting on the planar pixel arrangement 2. This can result in a particularly robust structure of the field-of-vision display device 1 and protect both the planar pixel arrangement 2 and the reflection surfaces 4 from damage and also the user 6 from injuries on freestanding edges. In particular, the freestanding upper prism edges 10 can additionally be rounded or chamfered for this purpose (cf. FIG. 11a) and in particular can also be made light-absorbing, for example in a similar way as the rear sides of the reflection surfaces and for the same purpose.

In particular, the respective prism 9 in FIG. 1 has a triangular cross-sectional area A, so that its other, lower lateral surface side 9a rests on the planar pixel arrangement 2, while its third lateral surface side is used as the light exit surface 13a for the deflected projection light beam L. The light exit surfaces 13a can in particular be provided on the outside with a suitable antireflective coating. In FIG. 1, the lateral surface sides 9a of the prisms 9 resting on the planar pixel arrangement 2 directly adjoin one another solely by way of example.

In the geometrical arrangement of the reflection surfaces 4 shown in FIG. 1, in particular a nearly complete suppression of interfering reflections of the ambient light 12 from any directions from outside and inside the motor vehicle can be achieved by their light-absorbing rear sides 11, which is symbolically indicated in FIG. 1 by an interfering-reflection-free region 6a around the user 6. For this purpose, for example, light exit planes 13, which connect an upper edge of the one reflection surface and the lower edge of the rear side 11 of the closest reflection surface for each two adjacent reflection surfaces 4 and in which the light exit surfaces 13a of the prisms 9 are located in this example, can be aligned essentially perpendicular to the windshield 5. In particular in this example, the reflection surfaces 4 and their light-absorbing rear sides 11 rest with their lower edges directly on the planar pixel arrangement 2, which can also comprise a protective cover layer etc. if needed.

Furthermore, a front reflection surface 4 located closest to the user 6 is covered by a darkened or light-absorbing cover surface 14 in the viewing direction of the user 6 to avoid dazzling of the user thereon. The cover surface 14 in this example covers a lateral surface side of the front prism 9 facing toward the user 6. In particular the same coating, for example a matte black coating, as in the light-absorbing rear sides 11 of the reflection surfaces 4 is suitable for the cover surface 14. Alternatively, for the same purpose a separate cover surface arranged in front of the front reflection surface 4 in the direction of the user can also be provided, so that the mentioned reflection surface 4 is usable for deflecting the projection light.

Furthermore, in FIG. 1, upper edges of the reflection surfaces 4 are located, solely by way of example, essentially on a line K from the viewpoint of the user 6 of the field-of-vision display device 1.

FIG. 2a schematically shows a perspective view of a possible extension of a field-of-vision display device 1 of the type described herein, in particular according to FIG. 1, in an upper side 7 of a dashboard 8 of a motor vehicle 15. An overall height of the field-of-vision display device 1 in a direction perpendicular to the planar pixel arrangement 2 can in particular only be a few centimeters, for example between 0.5 and 10 cm, in particular between 1 and 7 cm, for example approximately 2, 3, 4, 5, or 6 cm. Due to a correspondingly low installation depth of the field-of-vision display device 1, it can in principle occupy an entire surface of the upper side 7 of the dashboard 8 of the motor vehicle 15 in front of the windshield 5, as indicated by its possible contour 1a in FIG. 2a. For comparison, a light exit opening 16 and its edge 16a in the case of a conventional projection unit of an HUD mentioned at the outset with projection optical unit (not shown) housed below the upper side 7 of the dashboard 8 is indicated in FIG. 2a.

FIGS. 2b and 2d each schematically show a perspective view of a projection region 17 of the windshield 5 of the motor vehicle 15 usable by the field-of-vision display device 1 of FIG. 2a from the driver viewpoint, the boundary 17a of which corresponds to the contour 1a of the field-of-vision display device 1. A projection region 19 corresponding to the light exit opening 16 of a conventional projection unit and its boundary 19a are again indicated for comparison. In contrast thereto, the projection region 17 usable by the field-of-vision display device 1 can extend upward significantly above the horizon, as is clearly apparent, and can also laterally cover a large part of the road region to be observed by the driver in front of the windshield 5.

FIG. 2c schematically shows a perspective view of a projection region 18 of the windshield 5 of the motor vehicle 15 usable by the field-of-vision display device 1 of FIG. 2a from the front passenger viewpoint, the boundary 18a of which corresponds to the contour 1a of the field-of-vision display device 1. As is clearly apparent therefrom, the abovementioned effects of the field-of-vision display device 1 mentioned for the driver are also usable in the same way by the front passenger. This also accordingly applies similarly to further occupants of the motor vehicle 15, for example from a lounge position in the rear seat. Overall, a multiuser utilization is therefore possible with the field-of-vision display device 1. If the contents are each only to be seen by one user, the pixel matrix of the planar pixel arrangement 2 is to be actuated via the evaluation of an eye tracking for all users to be taken into consideration in such a way that the image can only be seen by the relevant user.

FIGS. 3a to 3c show, each in a perspective view, a greatly simplified model example for a field-of-vision display device 1 of the type described herein (for example, according to FIG. 1) to explain the deflection effect of its reflection-suppressing deflection arrangement 3, the reflection surfaces 4 of which are formed in this model by rear lateral surface sides, facing away from the observer or user, of two prisms 9 having triangular cross-sectional areas A.

The planar pixel arrangement 2 is designed in this model example as a flat display screen, which generates a desired display content, in this example the two-dimensional image of a butterfly shown in FIG. 3a, which is transported by the projection light beam L (cf. FIG. 1) originating from the flat display screen. Upon passing the reflection-suppressing deflection arrangement 3 arranged on the planar pixel arrangement 2, the projection light beam L is deflected on the reflection surfaces 4 of the rear lateral surface sides of the prisms 9, in order, for example as shown in FIG. 1, to reach the windshield 5 of the motor vehicle and, reflected therefrom, the eyes of the user 6.

As can be seen in FIG. 3b, the projection light beam L coupled in through the lower lateral surface sides 9a of the prisms 9 exits from their light exit surfaces 13a, while the rear sides 11 of the reflection surfaces 4 are designed as light-absorbing for interfering reflection suppression for the ambient light. As FIG. 3c shows, the projection light beam L coupled into the reflection-suppressing deflection arrangement 3 leaves the light exit surfaces 13a of the prisms 9 essentially without loss of brightness and also, upon suitable actuation of the planar pixel arrangement 2 as in FIG. 3a, without loss of shape.

Figure 4A:
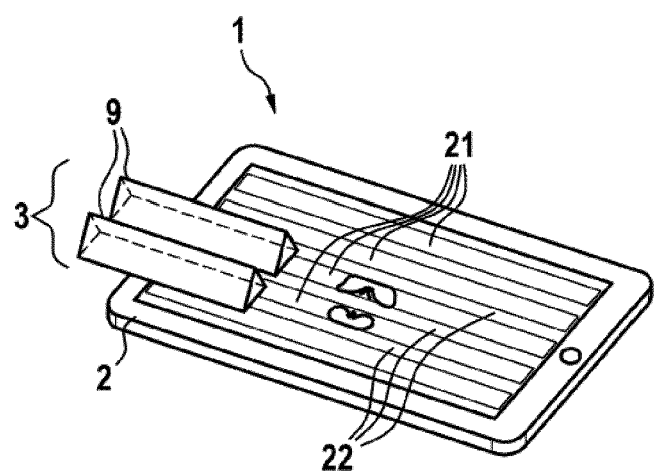
FIGS. 4a and 4b show perspective views of a further model example of a field-of-vision display device of the type described herein to explain the occurrence of visible and invisible strips in a surface containing the planar pixel arrangement.
Figure 4B:
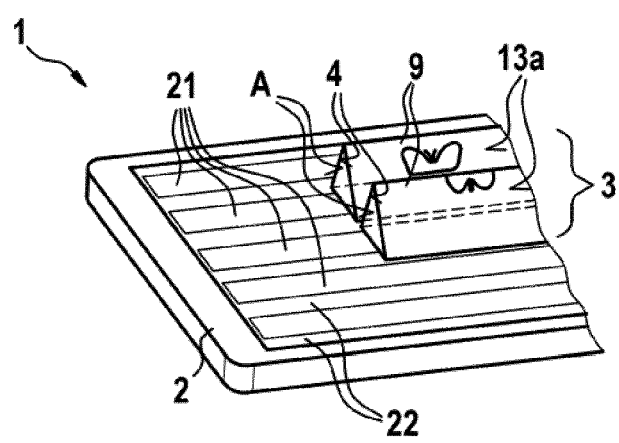

FIGS. 4a and 4b each show a perspective view of a further greatly simplified model example of a field-of-vision display device 1 of the type described herein (for example according to FIG. 1) to explain the occurrence of visible and invisible strips in a surface containing the planar pixel arrangement 2. Similar to FIGS. 3a-3c, the planar pixel arrangement 2 is also designed here as a flat display screen, which generates a desired display content, in this example the two-dimensional image of a butterfly shown in FIG. 4a. The reflection-suppressing deflection arrangement 3 arranged on the planar pixel arrangement 2 is also formed in this model example, similarly to FIGS. 3b-3c, by prisms 9 resting on the flat display screen and adjoining one another with their long sides, of which only two of possibly more than two prisms are also shown here for the sake of simplicity.

As is also indicated in FIGS. 4a and 4b, strips 21 parallel to the reflection surfaces 4 of the prisms 9 extend in the pixel surface, which can be made visible to the user of the field-of-vision display device 1 by the deflection of the projection light on the reflection surfaces 4 of up to five identical prisms 9 here. Strips 22 invisible to the user of the field-of-vision display device 1 are located between them.

The invisible strips 22 can therefore be left black in the pixel arrangement or can be used for other functions, for example as an air outlet for a windshield heater or interior ventilation, as an opening for a sound source, as a light source of diffuse interior illumination, or as an overlap region in the nesting or steps of adjacent partial surfaces of a compound planar pixel arrangement.

In particular, for this purpose, for example in FIG. 1, a first reflection surface 4 farthest away from the user 6 can also be placed without a prism directly below a windshield base of the windshield 5 of the motor vehicle and thus, in contrast to freestanding reflection surfaces, can be protected both mechanically and also against possible user injuries. Alternatively to omitting a prism 9, in these and/or other reflection surfaces 4 (and not only in this example), prism edges which are opposite to the respective reflection surfaces 4 can be cut off in a region corresponding to the invisible strips 22, which is not passed by the projection light beam L, and thus result in a quadrilateral or pentagonal cross-sectional area A. Thus, for example, the invisible strips 22 can be used in another way as mentioned and/or the weight and the material consumption of the reflection-suppressing deflection arrangement can be reduced.

Figure 5A:
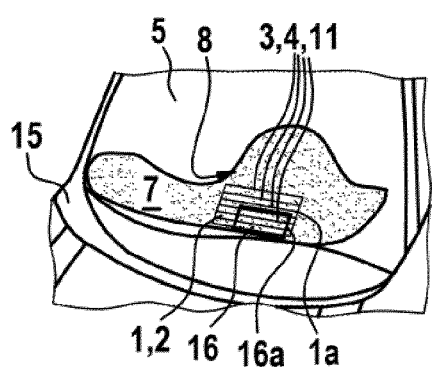
FIG. 5a shows a perspective view of a possible arrangement of a field-of-vision display device of the type described herein in an upper side of a dashboard of a motor vehicle.

FIG. 5a shows a perspective view of a possible arrangement of a field-of-vision display device 1 of the type described herein (for example according to FIG. 1) in an upper side 7 of a dashboard 8 of a motor vehicle 15. Due to its flat structure, the field-of-vision display device 1 can extend along the upper side 7 of the dashboard 8 significantly beyond the edge 16a, indicated in FIG. 5a for comparison, of a light exit opening 16 of a projection unit of the conventional HUD structure described at the outset. As described above for FIG. 2a, the field-of-vision display device 1 can occupy up to the entire surface of the upper side 7 of the dashboard 8.

In FIG. 5a, a planar pixel arrangement 2 of the field-of-vision display device 1 occupies a partial surface of the upper side 7 of the dashboard 8 of the motor vehicle 15 in front of the windshield 5, which is bounded solely by way of example by a quadrilateral contour 1a. The planar pixel arrangement 2 can be designed in particular as one or more 2D or 3D flat display screens arranged adjacent to one another flatly or nested or stepped. In the direction of the windshield 5, the planar pixel arrangement 2 is covered by a reflection-suppressing deflection arrangement 3, the multiple parallel reflection surfaces 4 of which or the light-absorbing rear sides 11 thereof are indicated by parallel lines.

Figure 5B:
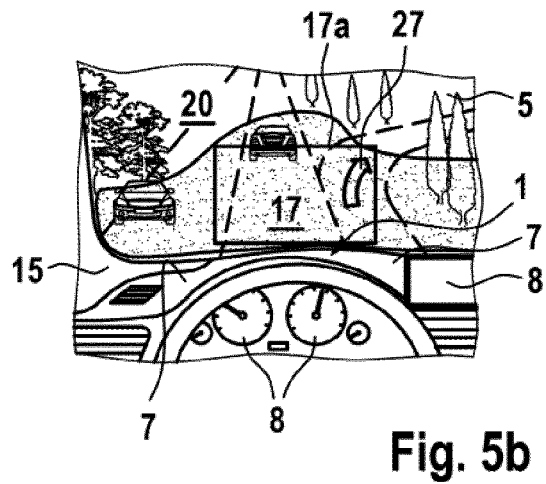
FIG. 5b shows a perspective view of a projection region usable with the field-of-vision display device of FIG. 5a in the windshield of the motor vehicle from the driver viewpoint with a virtual turnoff arrow overlaid in a contact-analog manner.

FIG. 5b shows the projection region 17 in the windshield 5 usable by the field-of-vision display device 1 of FIG. 5a, the boundary 17a of which corresponds to the contour 1a of the field-of-vision display device 1. The projection region 17 clearly extends upward significantly beyond the horizon and also laterally covers multiple lanes of the road region to be surveyed by the driver in front of the motor vehicle 15. Due to the correspondingly large spatial angle or field of vision of the field-of-vision display device 1, it is very well suitable in particular for contact-analog overlay of virtual assistance contents into the field of vision of the driver depending on the real environment 20 in front of the motor vehicle 15. In particular, a real contact-analog 3D effect (stereo-augmented reality) is possible using the field-of-vision display device 1.

Figure 6:
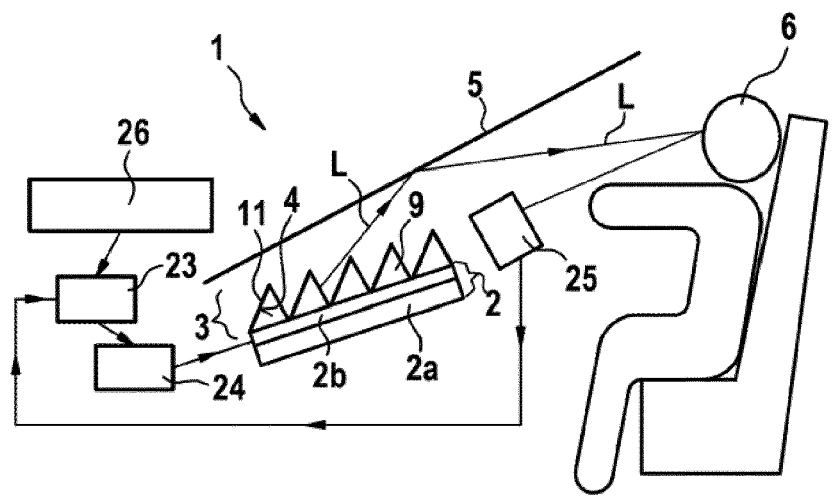
FIG. 6 shows a schematic lateral cross-sectional view of a field-of-vision display device of the type described herein having actuation components for its planar pixel arrangement to carry out a method of the type described herein.

FIG. 6 shows a schematic lateral cross-sectional view of a field-of-vision display device 1 according to FIG. 1 and FIG. 2a or 5a, the audio stereoscopic planar pixel arrangement 2 of which includes, for example, a bright display screen 2a, for example a liquid crystal display screen or any other standard display screen, for example also usable in the conventional HUD, and a microlens array 2b attached thereon or other type of deflection means according to DE 10 2009 054 232 A1, which deflects light beams of different light spots of the display screen 2a in different emission directions.

To actuate the planar pixel arrangement 2 to generate a contact-analog 3D effect at the user 6, furthermore a control unit 24 for the display screen 2a and the microlens array 2b is provided in a way known per se. The control unit 24 can receive, for example, a display content to be displayed as a virtual display image from an image generating unit 23. In this case, the image generating unit 23 can be designed in particular for calculating a suitable stereoscopic display of environmental objects to be displayed for the user 6 and for this purpose can receive, for example from an environmental acquisition unit 26, data about a currently upcoming environment 20 of the motor vehicle 15 and/or a current eye position of the user 6 from an eye tracking unit 25, which can comprise, for example, one or more cameras. The respective signal lines are indicated by arrows in FIG. 6.

The control unit 24 is designed in cooperation with the image generating unit 23 for carrying out the method of the type described herein in all of its embodiments described herein. The (travel) situation parameters required for this purpose are provided in this example by the environmental acquisition unit 26, the eye tracking unit 25, and further suitable sensors and systems known per se on board the motor vehicle 15.

FIGS. 10a-10b show perspective views of a model example of a field-of-vision display device 1 of the type described herein according to FIGS. 3a-4b having only two reflection surfaces 4 solely by way of example, which are in turn formed solely by way of example by lateral surface sides of prisms 9. FIG. 10b visualizes the method embodiment described above in which an overlap 61a (bounded by a box for illustration) of object components 61 and 62 belonging to adjacent reflection surfaces 4 is generated within the planar pixel arrangement 2 (cf. FIGS. 3a-3b, concealed in FIGS. 10a-10b), so that the allocation of corresponding components of the virtual object (a butterfly here) still merge into one another without interruptions even in the event of rapid vertical displacements of the head of the user, i.e. which can no longer be algorithmically compensated for. FIG. 10a shows for comparison the object component 61 sufficient for normal slow or absent head movements in these terms, without overlap with object component 62, which results for such cases in a virtual display image of the butterfly without interruptions (cf. FIG. 3c).

Figure 11C:
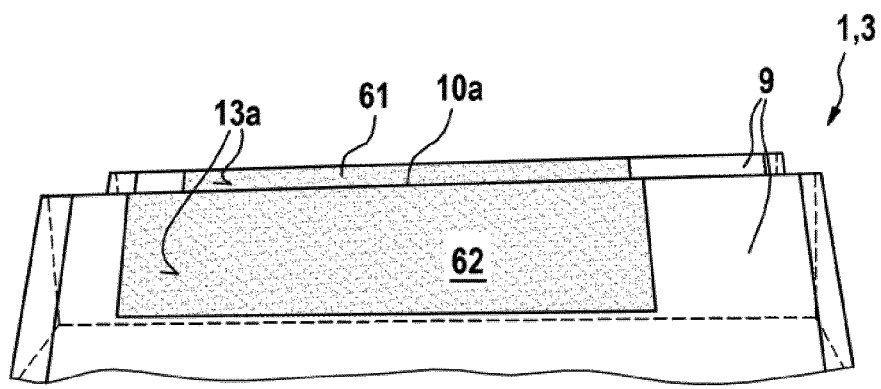

FIGS. 11a-11c is show perspective views of a further model example of a field-of-vision display device 1 of the type described herein, which differs from FIGS. 3a-4b only by way of the flat, in particular horizontal chamfer 10a, shown in greater detail in FIG. 11a, of the upper prism edges 10 of the prisms 9 (cf. FIG. 1). FIGS. 11b-11c visualize the above-described method embodiment, in which the flat chamfer 10a of the upper prism edges 10 is aligned along on acquired viewing direction of the user in consideration of the reflection on the windshield 5 (not shown here for the sake of simplicity). In FIG. 11b (before the alignment), a transition strip 63 caused by the prism edge 10 is visible between components 61 and 62 of an object (in the form of a continuous monochrome surface here) belonging to adjacent reflection surfaces 4, which transition strip no longer appears in FIG. 11c (after the alignment).

Figure 12A:
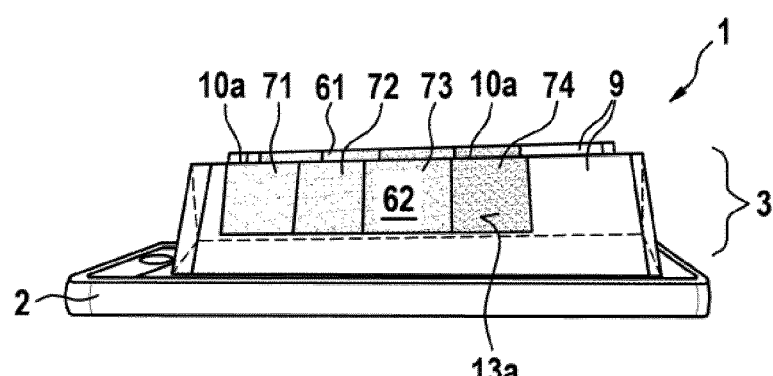
FIGS. 12a and 12b show perspective views according to FIG. 11c each having different examples of an object to be displayed.
Figure 12B:
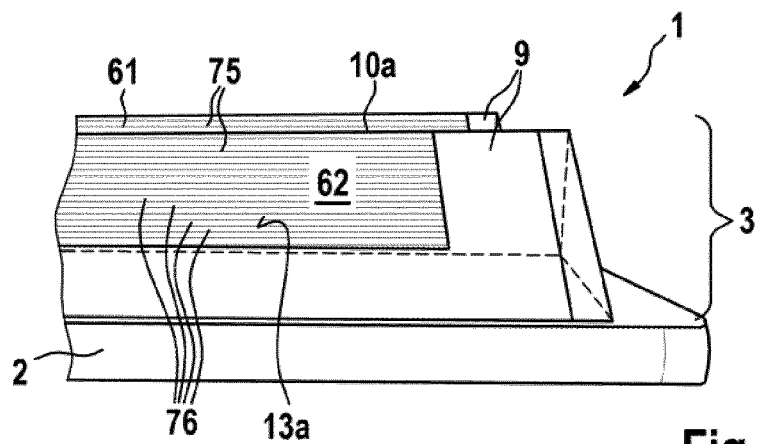

FIGS. 12a-12b show perspective views according to FIG. 11c each having other examples of an object to be displayed, which, as in FIG. 11c, is visible to the user due to the described alignments in each case without a transition strip 63 (FIG. 11b) between object components 61 and 62. FIG. 12a shows an object made up of different-colored vertical strips 71-74 from a laterally slightly displaced viewing angle. Due to this lateral viewing displacement, a parallax of the vertical strips 71-74 in the object components 61 and 62 is apparent in FIG. 12a, which can in turn be remedied by a suitable algorithm of the abovementioned type, i.e. by an opposing lateral offset of the object components 61 and 62 belonging to adjacent reflection surfaces 4 within the planar pixel arrangement 2. FIG. 12*b* shows an example of a concealing texture 75 also mentioned above having horizontal structures 76, lines or strands of a mesh here, for an object allocated onto adjacent reflection surfaces 4, whereby a transition strip 63 visible in FIG. 11*b* would be invisible in FIG. 12*b* even with absent alignment of upper prism edges 10*a*.

Figure 13A:
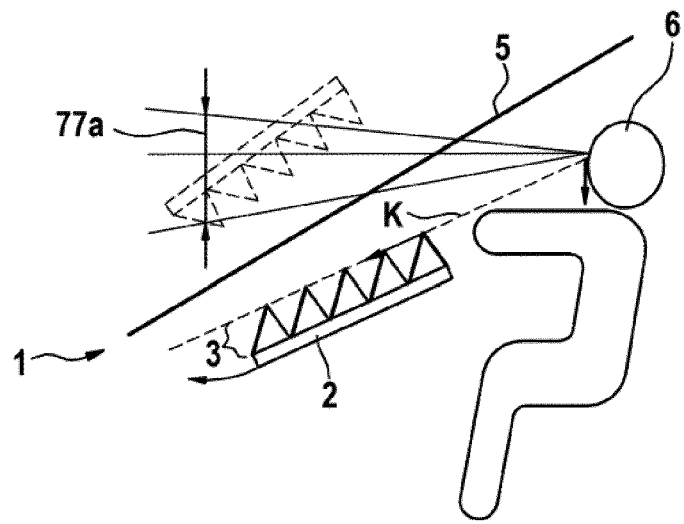
FIGS. 13a and 13b show schematic lateral cross-sectional views of a field-of-vision display device of the type described herein to explain the alignment of upper edges of the reflection surfaces on a line leading to the eyes of the user by means of a continuously adjustable slide rail.
Figure 13B:
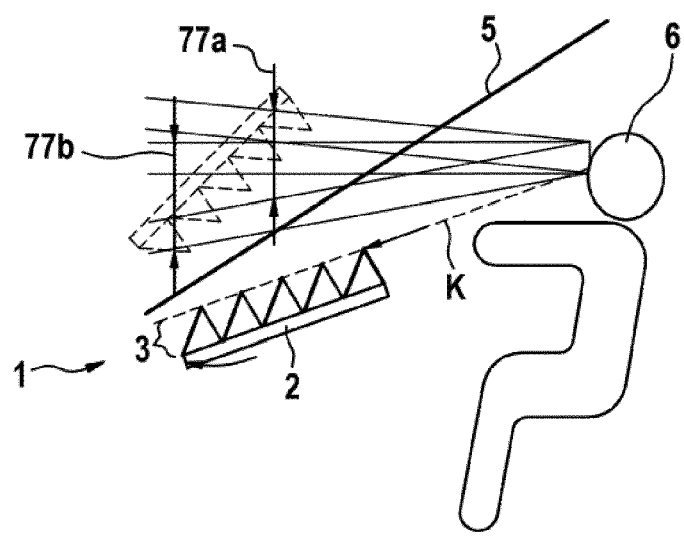

FIGS. 13*a*-13*b* show schematic lateral cross-sectional views of a field-of-vision display device 1 of the type described herein, in particular according to FIG. 1 or 6, to explain the alignment of upper edges 4*a* of the reflection surfaces 4 on a line K leading to the eyes of the user 6 by means of a continuously adjustable slide rail (not shown). Thus, for example, a substantially identical field of vision 77*a* or 77*b* is settable by the field-of-vision display device 1 for eye positions at different heights of a user 6. Thus, for example, the edge alignment on line K shown in FIG. 13*a* for a tall user 6 can be adapted in the event of a change to a shorter user 6, as indicated in FIG. 13*a* by an arrow for lowering the eye position, by a displacement of the field-of-vision display device 1 toward the windshield 5 and tilting around a horizontal axis perpendicular thereto, as again indicated by arrows. FIG. 13*b* shows the position thus adapted of the field-of-vision display device 1 to the shorter user 6. A solely imaginary mirror-image position of the field-of-vision display device 1 with respect to the windshield 5 for the reader is shown by dashed lines in each of FIGS. 13*a*-13*b*, in order to illustrate the adjustment of the spatial angle of the virtual display image (not shown) effectuated by means of the slide rail.

Figure 14:
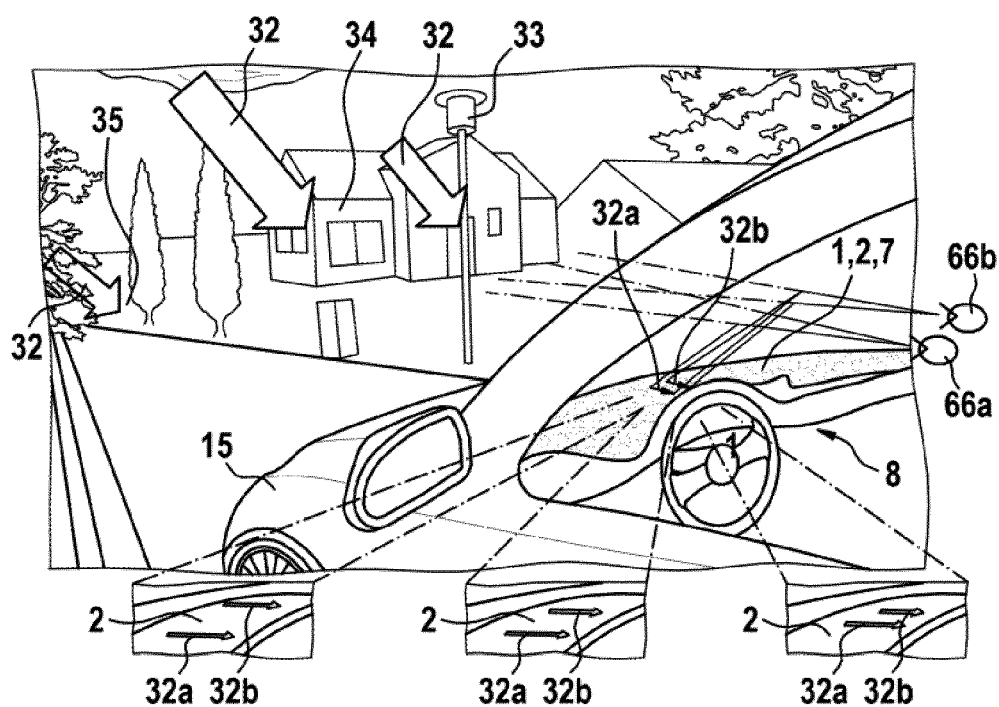
FIG. 14 shows a perspective view of a field-of-vision display device of the type described herein in an upper side of a dashboard of a motor vehicle having three enlarged details to explain an adaptation of the generated 3D distance of a marking arrow overlaid in a contact-analog manner to an acquired distance of the respective background object to be marked.

FIG. 14 shows a perspective view of a field-of-vision display device 1 of the type described herein, in particular according to FIG. 1 or 6, which is arranged, for example, according to FIG. 2*a* in an upper side 7 of a dashboard 8 of a motor vehicle 15. For simplified illustration, the reflection-suppressing deflection arrangement 3 applied to the planar pixel arrangement 2 is not shown in greater detail in FIG. 14. The lower part of FIG. 14 shows three different examples of an enlarged detail of the planar pixel arrangement 2, in which a 3D display of a marking arrow 32 overlaid in a contact-analog manner is generated in each case for different acquired distances of the background object to be marked. According to the above-described method embodiment, the generated 3D distance of the marking arrow 32 is adapted by respective different distances of the individual images 32*a* and 32*b* for left eye 66*a* and for right eye 66*b* of the user within the planar pixel arrangement 2. As shown from right to left in FIG. 14, individual images 32*a* and 32*b* displayed close to one another within the planar pixel arrangement 2 result in a nearby 3D object (marking arrow 32 at a streetlamp 33), individual images 32*a* and 32*b* spaced apart somewhat farther result in a 3D object located somewhat farther away (marking arrow 32 at a target building 34), and individual images 32*a* and 32*b* spaced apart still further result in an even more remote 3D object (marking arrow 32 at a turnoff 35).

Figure 7:
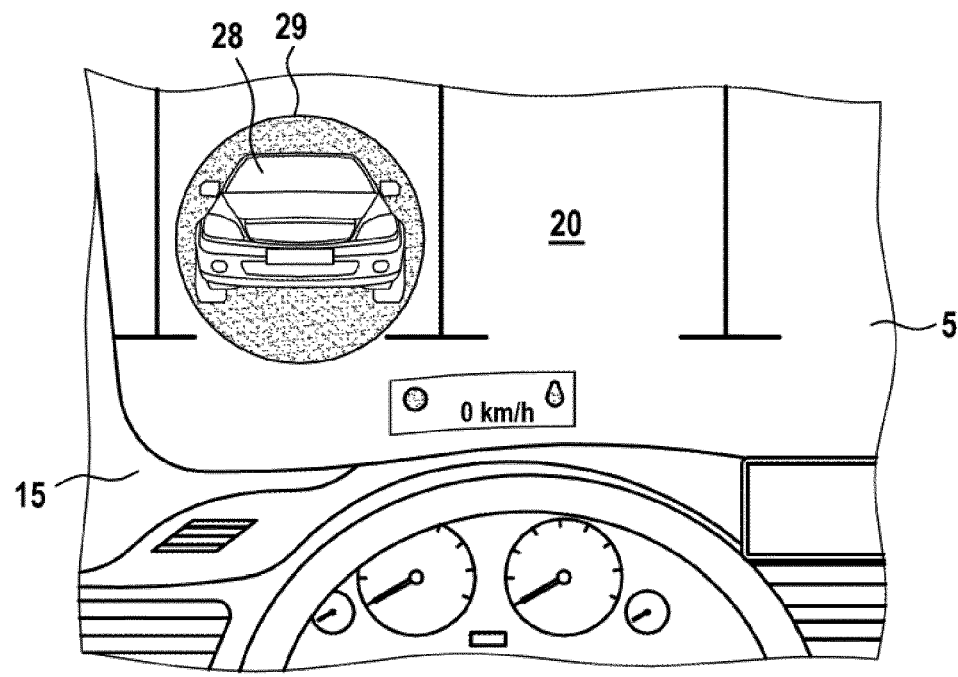
FIG. 7 shows a perspective windshield view from the driver viewpoint having a virtual marking of an external vehicle overlaid in a contact-analog manner using the field-of-vision display device of FIG. 6.

Refinements of the method of the type described herein for operating a field-of-vision display device 1 according to FIG. 6 are described with reference to FIGS. 5*b*, 7, and 8. (In this case, the contents 29, 30, and 31 overlaid as virtual display images in FIGS. 7 and 8 do not have boundary lines, rather the indicated boundary lines are only used for clarification for the reader.)

In a variant of the method, an environment 20 of the motor vehicle 15 currently upcoming behind the windshield 5 is acquired by the environmental acquisition unit 26. As a function of the acquired environment 20, contact-analog items of information such as virtual object images and/or object markings are overlaid in the field of vision of the user 6, in particular of the driver of the motor vehicle 15, to assist the user 6 during the navigation in the case of independent or assisted driving or for visualization/illustration of a driving situation acquired by the motor vehicle 15 and its driving intention in the case of highly automated or fully automated driving (HAD/FAD). Thus, a virtual turnoff arrow 27 is overlaid in the correct turnoff point of the upcoming road in a contact-analog manner in FIG. 5*b*, an external vehicle 28 acquired on a parking space in darkness in front of the ego motor vehicle 15 is clearly visibly virtually marked using a colored, for example red circle 29 in FIG. 7*a*, and on a road without lane markings, a correct lane in front of the ego motor vehicle 15 is visualized by a continuous colored, for example yellow, virtual lane marking 30 in the form of the entire lane to be traveled in FIG. 8.

Figure 8:
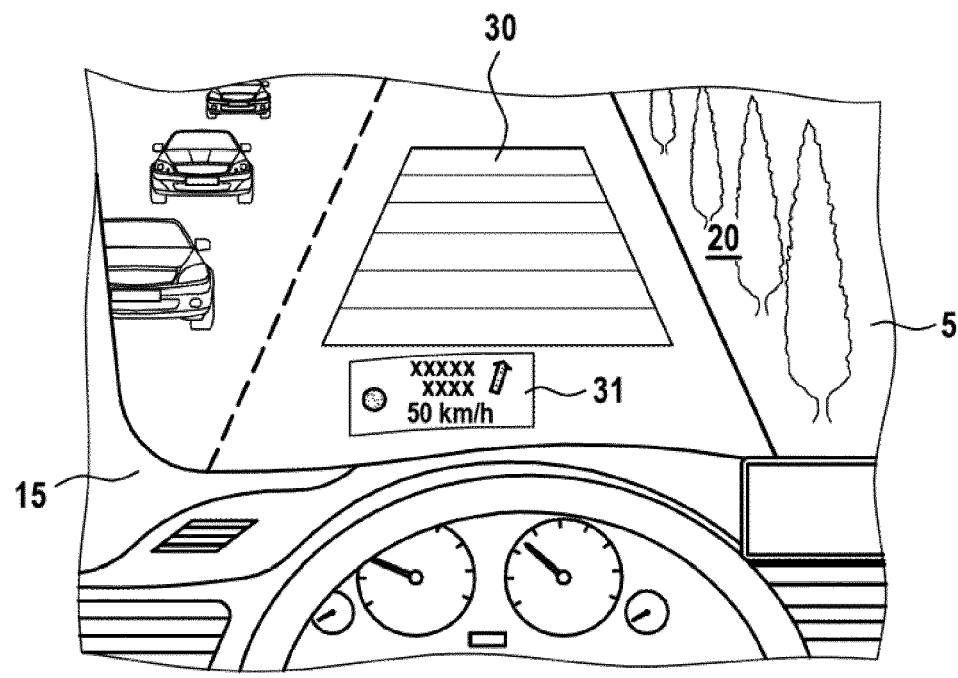
FIG. 8 shows a further perspective windshield view from the driver viewpoint having a virtual marking of a lane overlaid in a contact-analog manner using the field-of-vision display device of FIG. 6 and a further virtual display content statically overlaid by means of an additional conventional projection unit.

A further variant of the method combinable with the above is described on the basis of FIG. 8. The field-of-vision display device 1 furthermore comprises here, according to a so-called "hybrid approach", in addition to the planar pixel arrangement 2 and the reflection-suppressing deflection arrangement 3, a conventional projection unit of the type mentioned at the outset (not shown) for generating a further virtual display image 31 overlaid in a field of vision of a user 6.

In this hybrid approach, the planar pixel arrangement 2 having the reflection-suppressing deflection arrangement 3 arranged thereon can be arranged in the upper side 7 of the dashboard 8 of the motor vehicle 15, for example, as indicated in FIG. 5*a*, adjacent to the light exit opening 16 of the projection unit, in particular directly adjoining thereon or around it. In particular, however, the light exit opening 16 of the projection unit—in contrast to what is shown in FIG. 5*a* for its conventional location—can be arranged closer to the windshield base of the windshield 5 and adjoining the lower contour side of the planar pixel arrangement 2 in FIG. 5*a* and can be formed more elongated in the horizontal direction than in FIG. 5*a*, in order to thus be used to display the further virtual display image 31 lower below the horizon, for example directly below the contact-analog virtual display image generated by the planar pixel arrangement 2.

This conventional projection unit comprises here in its interior both an imaging unit for generating a further projection light beam having the display content of the further virtual display image 31 and also a projection optical unit arranged opposite to the imaging unit for projecting the generated further projection light beam on a partial surface of the windshield 5. The conventional HUD technology can thus be combined with that above, in order to be used simultaneously or alternately depending on the situation.

Figure 9A:
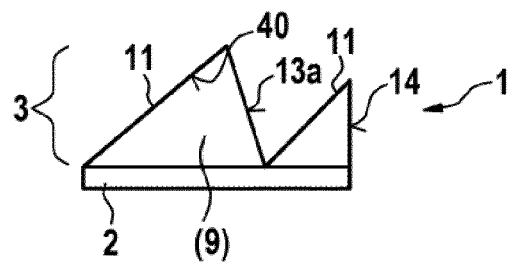
FIGS. 9a and 9b show schematic lateral cross-sectional views of further field-of-vision display devices of the type described herein.
Figure 9B:
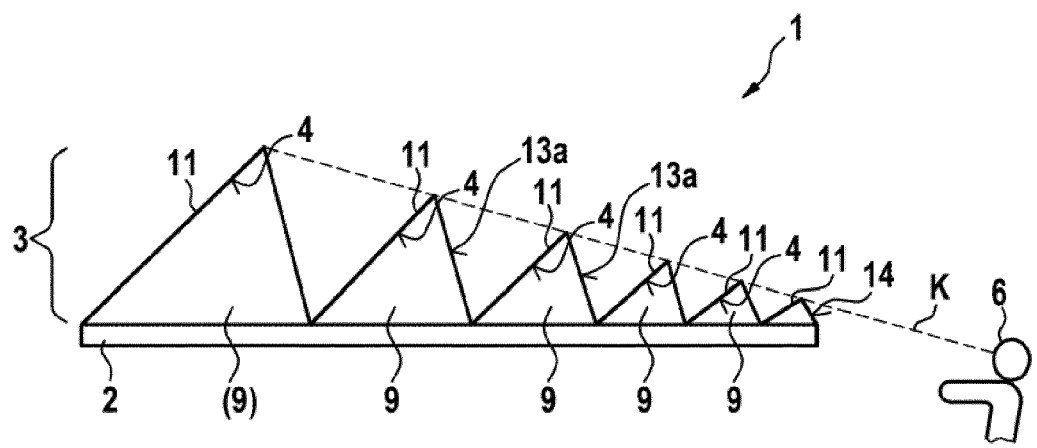

FIGS. 9*a*-9*b* each show, in a schematic vertical cross-sectional view, further specific designs of the field-of-vision display device 1 of the type described herein. The reflection-suppressing deflection arrangement 3 of FIGS. 9*a*-9*b* differs from that of FIGS. 1 and 6 in that they only include one single large reflection surface 40 (FIG. 9*a*) or multiple reflection surfaces 4 having heights varying among one another perpendicular to the planar pixel arrangement 2 (FIG. 9*b*).

Using the field-of-vision display device 1 shown in FIG. 9*a* having a single large reflection surface 40, which is approximately 6 cm tall (in the direction perpendicular to the planar pixel arrangement 2), for example, a field of vision can already be achieved which is comparable in the vertical direction to the conventional HUD mentioned at the outset in current motor vehicles. At the same time, however, the field-of-vision display device 1 of FIG. 9a can be made significantly wider than the conventional HUD in the horizontal direction due to its flat structure, which can overall result in a correspondingly significantly larger field of vision. It is possible here, but is not absolutely necessary, for the reflection surface 40 to be formed by a lateral surface side of a prism 9. Instead, the reflection surface 40 can also simply be an inclined mirror having a thickness required for its stability and the freedom from injury of a user, because this thickness has no influence on the generated virtual display image. This also applies for the reflection surface 4 respectively arranged closest to the windshield 5 in FIGS. 1 and 6. As also in FIGS. 1 and 6, a trap having a light-absorbing cover surface 14 facing toward the user 6 and a light-absorbing rear side 11 parallel to the reflection surface 40 is arranged opposite to the reflection surface 40 in FIG. 9a for interfering reflection suppression.

The same statement as for the reflection surface 40 of FIG. 9a can apply in FIG. 9b to the first reflection surface 4 from the left, which is arranged in a motor vehicle closest to its windshield 5, for example. An even larger field of vision of the field-of-vision display device 1 than in FIG. 9a is achievable by further reflection surfaces 4, which are each successively reduced in their height and are formed as shown in FIG. 9b by prisms 9 correspondingly of different heights.

Due to the successively decreasing heights of the reflection surfaces 40, 4 or their rear sides 11 in FIGS. 9a and 9b, their upper edges can be aligned on a line K leading to the eyes of the user 6 even with a section of the upper side 7 of the dashboard 7 of the motor vehicle inclined more strongly in relation to the windshield 5 than in FIG. 1, for example.

In the method of the type described herein, in particular in the case of the field-of-vision display devices shown in FIGS. 1 to 14, using a planar pixel arrangement 2, which includes at least one 2D display screen instead of or addition to an autostereoscopic display screen, a virtual display image can be generated at a fixed distance of somewhat less or greater than a meter, in the case of typical motor vehicle dimensions approximately 1.2 m, from the user 6. Without eye tracking having to be evaluated, items of information, for example on the vehicle state, can be permanently displayed in this region, for example as a replacement for a conventional instrument cluster display. However, in principle all other types of information can also be displayed in this way, in particular contact-analog overlays in the acquired environment behind the projection pane, which were mentioned herein with reference to a 3D display.

LIST OF REFERENCE SIGNS 1 field-of-vision display device
1a contour of the field-of-vision display device in an upper side of a dashboard
2 planar pixel arrangement
2a display screen
2b microlens array
3 reflection-suppressing deflection arrangement
4, 40 inclined reflection surfaces parallel to one another of the reflection-suppressing deflection arrangement
5 windshield
6 user of the field-of-vision display device
66a, 66b left, right eye of the user
7 upper side of the dashboard
8 dashboard of a motor vehicle
9 prism
9a lower lateral surface side of a prism
10 upper prism edge
10a flat chamfer of the upper prism edge
11 light-absorbing rear sides of the reflection surfaces of the reflection-suppressing deflection arrangement
12 ambient light
13 light exit plane(s) of the reflection-suppressing deflection arrangement
13a light exit surface of a prism
14 cover surface
15 motor vehicle
16 light exit opening of a conventional HUD projection unit
16a edge of the light exit opening
17 projection region of the field-of-vision display device in the windshield from driver viewpoint
17a boundary of the projection region from driver viewpoint
18 projection region of the field-of-vision display device in the windshield from front passenger viewpoint
18a boundary of the projection region from front passenger viewpoint projection region of a conventional HUD projection unit
19a boundary of the projection region of the conventional HUD projection unit
20 upcoming environment or environment located behind the projection pane
21 visible strip
22 invisible strip
23 image generating unit
24 control unit
25 eye tracking unit
26 environmental acquisition unit
27 turnoff arrow overlaid in a contact-analog manner
28 acquired external vehicle in front of the ego motor vehicle
29 marking overlaid in a contact-analog manner of the acquired external vehicle
30 lane marking overlaid in a contact-analog manner
31 static overlaid further virtual display image of an additionally provided conventional HUD projection unit
32 marking arrow overlaid in a contact-analog manner
32a, 32b individual images of a 3D object generated for left and right eye
33, 34, 35 acquired current background
61, 62 object components allocated to adjacent reflection surfaces
61a overlap
63 transition strip
75 concealing texture
76 horizontal structures of the concealing texture
77a, 77b tall field of vision for tall driver, shorter field of vision for short driver
L projection light beam
A cross-sectional area of a prism
K line from user viewpoint, on the upper edges of which the multiple reflection surfaces are located

What is claimed is:

1. A method for operating a field-of-vision display device for a motor vehicle, the method comprising:
generating, by an electrically actuatable planar pixel arrangement, a projection light beam having a display content;
projecting, by a reflection-suppressing deflection arrangement arranged on the planar pixel arrangement having one or more flat reflection surfaces extending along the planar pixel arrangement at a predetermined acute angle in relation thereto and parallel to one another, the generated projection light beam on a partially transparent reflective projection pane comprising a windshield of the motor vehicle, whereby a virtual display image overlaid in a field of vision of a user is generated behind the windshield, wherein the one or more flat reflection surfaces are light-absorbing on a rear side thereof for interfering reflection suppression; and
providing at least one travel situation parameter, depending on which different surface segments of the planar pixel arrangement are used in each case to generate a desired display content;
wherein providing the at least one travel situation parameter comprises acquiring a current user position, including an eye position or a viewing direction, and depending thereon, upon an allocation of an object to be displayed onto two or more flat reflection surfaces extending along the planar pixel arrangement in parallel to one another;
a lateral offset of object components belonging to adjacent reflection surfaces within the planar pixel arrangement is generated in such a way that allocation of corresponding components of a virtual object is displayed without parallax upon lateral displacements of a head of the user;
overlap of the object components belonging to the adjacent reflection surfaces within the planar pixel arrangement is generated in such a way that the allocation of the corresponding components of the virtual object merge into one another without interruptions even upon rapid vertical displacements of the head of the user; and
to avoid a visible transition between the allocation of the corresponding components of the virtual display image, smaller objects in a vertical direction are each generated in a surface segment of the planar pixel arrangement which belongs to a single reflection surface, or larger objects in the vertical direction are provided with a concealing texture having a horizontal structure.

2. The method according to claim 1, wherein
providing the at least one travel situation parameter comprises acquiring at least one of a current environment behind the projection pane, and
as a function of at least one of the acquired current environment and the acquired current user position, predetermined display contents to be displayed statically are generated in a surface segment of the planar pixel arrangement such that a background of the virtual display image behind the projection pane meets predetermined requirements for darkness.

3. A method for operating a field-of-vision display device for a motor vehicle, the method comprising:
generating, by an electrically actuatable planar pixel arrangement, a projection light beam having a display content;
projecting, by a reflection-suppressing deflection arrangement arranged on the planar pixel arrangement having one or more flat reflection surfaces extending along the planar pixel arrangement at a predetermined acute angle in relation thereto and parallel to one another, the generated projection light beam on a partially transparent reflective projection pane comprising a windshield of the motor vehicle, whereby a virtual display image overlaid in a field of vision of a user is generated behind the windshield, wherein the one or more flat reflection surfaces are light-absorbing on a rear side thereof for interfering reflection suppression; and
providing at least one travel situation parameter, depending on which different surface segments of the planar pixel arrangement are used in each case to generate a desired display content;
wherein providing the at least one travel situation parameter comprises acquiring a current background for predetermined virtual objects to be displayed in a contact-analog manner behind at least one of the projection pane and a current user position, including an eye position or a viewing direction, and, as a function thereof, the predetermined objects to be displayed in a contact-analog manner are at least one of
dynamically tracked by adapting their position within the planar pixel arrangement to a position of the acquired current background within the projection pane and/or the acquired current user position; and
adapted to a distance of the acquired current background by adapting object dimensions, and in a case of a 3D display, distances of the individual images for left and right eye are adapted within the planar pixel arrangement;
wherein in each case a brightness of the predetermined objects is adapted to a brightness of the acquired current background.

4. A method for operating a field-of-vision display device for a motor vehicle, the method comprising:
generating, by an electrically actuatable planar pixel arrangement, a projection light beam having a display content;
projecting, by a reflection-suppressing deflection arrangement arranged on the planar pixel arrangement having one or more flat reflection surfaces extending along the planar pixel arrangement at a predetermined acute angle in relation thereto and parallel to one another, the generated projection light beam on a partially transparent reflective projection pane comprising a windshield of the motor vehicle, whereby a virtual display image overlaid in a field of vision of a user is generated behind the windshield, wherein the one or more flat reflection surfaces are light-absorbing on a rear side thereof for interfering reflection suppression; and
providing at least one travel situation parameter, depending on which different surface segments of the planar pixel arrangement are used in each case to generate a desired display content;
wherein the field-of-vision display device is installed in a motor vehicle, the at least one travel situation parameter in each case currently comprises at least one of a movement of the motor vehicle, a control state of the motor vehicle, an onboard system state, an occupant state including a number and position of occupants in the motor vehicle, an upcoming environment, and upcoming route data and, as a function thereof in the field of vision of the driver and/or other occupants via respective suitable surface segments of the planar pixel arrangement,
contact-analog display contents, including at least one of virtual object images and markings are overlaid to assist the driver and to clarify a driving situation for the driver and the other occupants in a case of assisted or highly automated or fully automated driving;

predetermined static display contents, including safety-relevant specifications on at least one of the onboard system state and route data, are overlaid for at least one of the driver and the other occupants in the case of assisted or highly automated or fully automated driving;

entertainment contents are overlaid for one or more occupants in a case of a stationary vehicle or highly automated or fully automated driving, wherein the surface segments of the windshield corresponding to the respective surface segments of the planar pixel arrangement are switchable between transparent and dark to create a cinema experience; and predetermined, safety-relevant or legally prescribed specifications are generated via surface segments of the planar pixel arrangement to generate at least partially p-polarized light, wherein corresponding surface segments of the windshield are designed to reflect p-polarized light.

5. The method according to claim 1, wherein as a function of the current user position, upper edges of multiple reflection surfaces parallel to one another of the reflection-suppressing deflection arrangement are aligned from a viewpoint of the user essentially on a line leading to eyes of the user; and surface segments of the planar pixel arrangement, a light of which is located outside current eye boxes of all users, are used as a dazzle-free interior illumination source.

6. The method according to claim 1, wherein at least one of the one or more flat reflection surfaces of the reflection-suppressing deflection arrangement is formed by a lateral surface side of a prism arranged on the planar pixel arrangement having a triangular, quadrilateral, or pentagonal cross-sectional area, wherein providing the at least one travel situation parameter comprises acquiring a current viewing direction of the user and depending thereon a flat, horizontal chamfer of one or more upper prism edges is aligned essentially along the acquired viewing direction of the user in consideration of the reflection on the projection pane.

7. The method according to claim 1, wherein for each two adjacent reflection surfaces, a light exit plane, which connects an upper edge of one reflection surface and a lower edge of the rear side of a closest reflection surface, is aligned essentially perpendicular to the projection pane in operation of the field-of-vision display device.

8. A non-transitory computer-readable medium storing a program which, when executed in a control unit, executes a method comprising:

generating, by an electrically actuatable planar pixel arrangement, a projection light beam having a display content; and projecting, by a reflection-suppressing deflection arrangement arranged on the planar pixel arrangement having one or more flat reflection surfaces extending along the planar pixel arrangement at a predetermined acute angle in relation thereto and parallel to one another, the generated projection light beam on a partially transparent reflective projection pane comprising a windshield of the motor vehicle, whereby a virtual display image overlaid in a field of vision of a user is generated behind the windshield, wherein the one or more flat reflection surfaces are light-absorbing on a rear side thereof for interfering reflection suppression;

providing at least one travel situation parameter, depending on which different surface segments of the planar pixel arrangement are used in each case to generate a desired display content;

wherein providing the at least one travel situation parameter comprises acquiring a current user position, including an eye position or a viewing direction, and depending thereon, upon an allocation of an object to be displayed onto two or more flat reflection surfaces extending along the planar pixel arrangement in parallel to one another;

a lateral offset of object components belonging to adjacent reflection surfaces within the planar pixel arrangement is generated in such a way that allocation of corresponding components of a virtual object is displayed without parallax upon lateral displacements of a head of the user;

overlap of the object components belonging to the adjacent reflection surfaces within the planar pixel arrangement is generated in such a way that the allocation of the corresponding components of the virtual object merge into one another without interruptions even upon rapid vertical displacements of the head of the user; and to avoid a visible transition between the allocation of the corresponding components of the virtual display image, smaller objects in a vertical direction are each generated in a surface segment of the planar pixel arrangement which belongs to a single reflection surface, or larger objects in the vertical direction are provided with a concealing texture having a horizontal structure.

9. A control unit for a field-of-vision display device, wherein the control unit is programmed to automatically carry out a method comprising:

generating, by an electrically actuatable planar pixel arrangement, a projection light beam having a display content; and projecting, by a reflection-suppressing deflection arrangement arranged on the planar pixel arrangement having one or more flat reflection surfaces extending along the planar pixel arrangement at a predetermined acute angle in relation thereto and parallel to one another, the generated projection light beam on a partially transparent reflective projection pane comprising a windshield of the motor vehicle, whereby a virtual display image overlaid in a field of vision of a user is generated behind the windshield, wherein the one or more flat reflection surfaces are light-absorbing on a rear side thereof for interfering reflection suppression;

providing at least one travel situation parameter, depending on which different surface segments of the planar pixel arrangement are used in each case to generate a desired display content;

wherein providing the at least one travel situation parameter comprises acquiring a current user position, including an eye position or a viewing direction, and depending thereon, upon an allocation of an object to be displayed onto two or more flat reflection surfaces extending along the planar pixel arrangement in parallel to one another;

a lateral offset of object components belonging to adjacent reflection surfaces within the planar pixel arrangement is generated in such a way that allocation of corresponding components of a virtual object is displayed without parallax upon lateral displacements of a head of the user;

overlap of the object components belonging to the adjacent reflection surfaces within the planar pixel arrangement is generated in such a way that the allocation of the corresponding components of the virtual object merge into one another without interruptions even upon rapid vertical displacements of the head of the user; and to avoid a visible transition between the allocation of the corresponding components of the virtual display image, smaller objects in a vertical direction are each generated in a surface segment of the planar pixel arrangement which belongs to a single reflection surface, or larger objects in the vertical direction are provided with a concealing texture having a horizontal structure.

10. A motor vehicle, comprising:

an upper side of a dashboard extending between a windshield of the motor vehicle and the dashboard;

a field-of-vision display device arranged on or in the upper side of the dashboard, which has an electrically actuatable planar pixel arrangement for generating a projection light beam having a display content and a reflection-suppressing deflection arrangement arranged thereon having one or more flat reflection surfaces extending along the planar pixel arrangement at a predetermined acute angle in relation thereto and parallel to one another for projecting the generated projection light beam on the windshield of the motor vehicle, whereby a virtual display image overlaid in a field of vision of the driver or other occupants is generated behind the windshield, wherein a rear side of the one or more flat reflection surfaces is light-absorbing for interfering-reflection suppression; and a control unit programmed to automatically carry out a method comprising:

generating, by the electrically actuatable planar pixel arrangement, the projection light beam having the display content;

projecting, by the reflection-suppressing deflection arrangement arranged on the planar pixel arrangement having the one or more flat reflection surfaces extending along the planar pixel arrangement at the predetermined acute angle in relation thereto and parallel to one another, the generated projection light beam on a partially transparent reflective projection pane comprising the windshield of the motor vehicle, whereby the virtual display image overlaid in the field of vision of the user is generated behind the windshield, wherein the one or more flat reflection surfaces are light-absorbing on the rear side thereof for interfering reflection suppression; and providing at least one travel situation parameter, depending on which different surface segments of the planar pixel arrangement are used in each case to generate a desired display content;

wherein the planar pixel arrangement or the reflection-suppressing deflection arrangement is arranged essentially flush with the upper side of the dashboard;

wherein providing the at least one travel situation parameter comprises acquiring a current user position, including an eye position or a viewing direction, and depending thereon, upon an allocation of an object to be displayed onto two or more flat reflection surfaces extending along the planar pixel arrangement in parallel to one another;

a lateral offset of object components belonging to adjacent reflection surfaces within the planar pixel arrangement is generated in such a way that allocation of corresponding components of a virtual object is displayed without parallax upon lateral displacements of a head of the user;

overlap of the object components belonging to the adjacent reflection surfaces within the planar pixel arrangement is generated in such a way that the allocation of the corresponding components of the virtual object merge into one another without interruptions even upon rapid vertical displacements of the head of the user; and to avoid a visible transition between the allocation of the corresponding components of the virtual display image, smaller objects in a vertical direction are each generated in a surface segment of the planar pixel arrangement which belongs to a single reflection surface, or larger objects in the vertical direction are provided with a concealing texture having a horizontal structure.

\* \* \* \* \*